United States Patent
Saint-Marcel (10) Patent No.: US 10,521,543 B1
(45) Date of Patent: Dec. 31, 2019

(54) SYSTEMS AND METHODS FOR ESTIMATING THE FUTURE ELECTRICAL RESISTANCE OF A WIRE OF A PARTIALLY ROUTED NET

(71) Applicant: CADENCE DESIGN SYSTEMS, INC., San Jose, CA (US)

(72) Inventor: Laurent Saint-Marcel, Mouans-Sartoux (FR)

(73) Assignee: Cadence Design Systems, Inc., San Jose, CA (US)

(*) Notice: Subject to any disclaimer, the term of this patent is extended or adjusted under 35 U.S.C. 154(b) by 154 days.

(21) Appl. No.: 15/642,848

(22) Filed: Jul. 6, 2017

(51) Int. Cl.
*G06F 17/50* (2006.01)
*G06F 16/532* (2019.01)

(52) U.S. Cl.
CPC ........ *G06F 17/5077* (2013.01); *G06F 16/532* (2019.01); *G06F 2217/06* (2013.01)

(58) Field of Classification Search
USPC ........................................................ 716/126
See application file for complete search history.

(56) References Cited

U.S. PATENT DOCUMENTS 6,725,439 B1 * 4/2004 Homsinger ......... G06F 17/5045
716/115
8,904,332 B1 * 12/2014 Neal ................... G06F 17/5068
716/113

* cited by examiner

*Primary Examiner* — Eric D Lee
(74) *Attorney, Agent, or Firm* — Eric L. Sophir; Dentons US LLP (57) ABSTRACT

Disclosed herein are embodiments of systems, methods, and products for dynamically determining and rendering a target resistance of a partially routed net between two circuit devices in an integrated circuit (IC) design and automatically resizing a wire segment being edited in real time based on the target resistance such that the fully routed net satisfies the maximum resistance constraint. Therefore, the embodiments disclosed herein simplify the circuit designer's job and improves design productivity. Unlike conventional systems, an EDA tool disclosed herein does not have to route the full net between two circuit devices to run design rule checking (DRC). Thus, the EDA tool does not require multiple iterations of fully routing a net and checking for DRC violations such that the maximum resistance constraint is not violated.

20 Claims, 7 Drawing Sheets

SYSTEMS AND METHODS FOR ESTIMATING THE FUTURE ELECTRICAL RESISTANCE OF A WIRE OF A PARTIALLY ROUTED NET

TECHNICAL FIELD

This application relates generally to the field of electronic circuit design, and more specifically methods and systems for estimating electrical resistance of a wire in a partially routed net.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for schematics, layouts, simulation, and verification of the complex circuits. Furthermore, EDA tools allow circuit designers to optimize a complex electronic circuit, for example, by reducing the footprints of the various circuit devices.

EDA tools typically use design rule checking (DRC) to determine whether the physical layout of a particular chip layout satisfies a series of recommended parameters called design rules. Design rules are specific to a particular semiconductor manufacturing process. A design rule set specifies certain geometric and connectivity restrictions to ensure sufficient margins to account for variability in semiconductor processes, so as to ensure that most of the parts work correctly. For example, a maximum resistance constraint between two circuit devices is a common design rule.

Conventional methods for checking if the maximum resistance constraint is violated are not efficient. Typically, the conventional methods may first do a complete routing of the net between the two circuit devices then run a checker that will compute the total resistance of each wire segment in the net. If the resistance does not satisfy the maximum resistance constraint, the circuit designer may change the resistance of one or more wire segments. For example, the width of one or more wire segments in the net may be changed. Alternatively, the wire segments may be rerouted. Then the checker may compute the new resistance of the wires segments and run the design rule checking again. This loop may be repeated while the resistance of the net does not satisfy the maximum resistance constraint. This loop is either done manually by a user or automatically by a router. In either case, the entire net has to be fully routed before the design rule checking. The conventional methods are therefore tedious. They take time, require many iterations and many routing modification to make the design satisfy the maximum resistance constraint, especially when the user or circuit designer creates the net manually.

It is desired to have EDA tools that solve the aforementioned problems of excess complexity and inefficiency. It is desired to have EDA tools that can estimate a wire resistance that satisfies the maximum resistance constraint, render the resistance dynamically and/or automatically update the wire segments width accordingly while the user is editing wire segments without having to route the entire net, so that the user or the EDA tool can adjust the resistance in the partially routed net to converge faster to a final design that has no resistance violation.

SUMMARY

Embodiments disclosed herein solve the aforementioned problems and other problems by dynamically providing estimation of the resistance in a partially routed net. Instead of running the iteration of routing the entire net and iteratively checking the DRC violations round after round until the resistance satisfies the maximum resistance constraint, the EDA tools disclosed herein dynamically display the estimated resistance in the wire automatically while the user is editing the wires. In this way, the user or the EDA tool can detect resistance constraint issue immediately and adjust the routing in real time. In other words, the user does not have to wait for having the net fully routed to do the check and modification. The EDA tools therefore provide a better functionality in a more efficient way.

In an embodiment, a computer implemented method comprises: receiving, by a computer, a request for dynamically editing a partially routed net between a first circuit device and a second circuit device in an integrated circuit (IC), wherein the partially routed net comprises one or more existing wire segments and one or more wire segments being edited; querying, by the computer, a design specification database to retrieve a maximum resistance constraint for a fully routed net between the first and second circuit devices; dynamically rendering, by the computer, the one or more wire segments being edited based upon one or more dynamic edit inputs received from the user; determining, by the computer, the target resistance of the one or more wire segments being edited based upon the resistance of the one or more existing wire segments, the maximum resistance constraint, the wirelength of the one or more wire segments being edited, and the length of the unrouted segment between the first and second circuit devices; determining, by the computer, the target resistance of the partially routed net based upon the resistance of the one or more segments being edited and the resistance of the one or more existing wire segments; dynamically rendering, by the computer, the target resistance of the partially routed net and the maximum resistance constraint for the fully routed net between the first and second circuit devices; and determining, by the computer, a width of the one or more wire segments being edited to realize the effective resistance of the one or more wire segments being edited to be equal to the target resistance of the one or more wire segments being edited such that the fully routed net satisfies the maximum resistance constraint.

In another embodiment, a computer based system comprises: one or more computers comprising a non-transitory machine-readable media configured to store a plurality of database records of a plurality of circuit devices forming an integrated circuit (IC); at least one computer of the one or more computers, the at least one computer coupled to the non-transitory machine readable media storing the plurality of database records and comprising a processor configured to: receive from a user, a request for dynamically editing a partially routed net between a first circuit device and a second circuit device of the plurality of circuit devices forming the IC, wherein the partially routed net comprises one or more existing wire segments and one or more wire segments being edited; query a design specification database to retrieve a maximum resistance constraint for a fully routed net between the first and second circuit devices; dynamically render the one or more wire segments being edited based upon one or more dynamic edit inputs; determine the target resistance of the one or more wire segments being edited based upon the resistance of the one or more existing wire segments, the maximum resistance constraint, the wirelength of the one or more wire segments being edited, and the length of the unrouted segment between the first and second circuit devices; determine the target resistance of the partially routed net based upon the resistance of the one or more segments being edited and the resistance of the one or more existing wire segments; dynamically render the target resistance of the partially routed net and the maximum resistance constraint for the fully routed net between the first and second circuit devices; and determine a width of the one or more wire segments being edited to realize the effective resistance of the one or more wire segments being edited to be equal to the target resistance of the one or more wire segments being edited such that the fully routed net satisfies the maximum resistance constraint.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments of the systems, products, and methods disclosed herein provide an efficient and flexible approach for dynamically estimating resistance of a wire segment in a partially routed net. As a result, the user or the EDA tool can adjust the resistance while editing the wire to ensure the resistance satisfies the maximum resistance constraint. As discussed above, the conventional systems are inefficient. For example, the conventional systems may have to route the entire net then run the checker to determine if the resistance satisfies the resistance constraint. If not, the user may need to redo the entire routing, compute the resistance, and check again, until the maximum resistance constraint is satisfied. Conventional systems may require multiple iterations and many routing modifications, especially if the user is creating the net manually.

In operation, the EDA tool may measure the effective resistance of a wire segment based on the characteristics of the wire segment, such as the width, the length and the metal layer. In other words, the effective resistance is the real resistance value measured and returned by the EDA tool. In addition, the EDA tool may estimate and compute the target resistance of a wire segment. The target resistance is a theoretical value computed by the EDA tool to ensure that a fully routed net between two circuit devices has a resistance that satisfies the maximum resistance constraint.

In contrast to the conventional systems, the embodiments discussed herein disclose an electronic design automation (EDA) tool that automatically computes the target wire resistance in a partially routed net and renders the target resistance of the partially routed net along with the maximum resistance constraint. Specifically, the EDA tool may estimate a target resistance value for an edited wire segment in order to satisfy the maximum resistance constraint. In one embodiment, the user may accept the target resistance value as the final effective resistance value, and the EDA tool may automatically convert the target resistance value into a wire segment width. The resulted resistance is the effective resistance with a resistance value equal to the target resistance value. In another embodiment, the user may further adjust the wire segment by referring to the estimated target resistance value. For example, the user may increase or decrease the resistance value by resizing the wire. In this case, the final effective resistance is different from the estimated target resistance. While the user is editing or adjusting the wire segments, the new target resistance value is dynamically computed and displayed. Since the user can adjust the resistance in real time without routing the whole net, the integrated circuit can converge faster to a final design that satisfies the resistance constraint.

Figure 1:
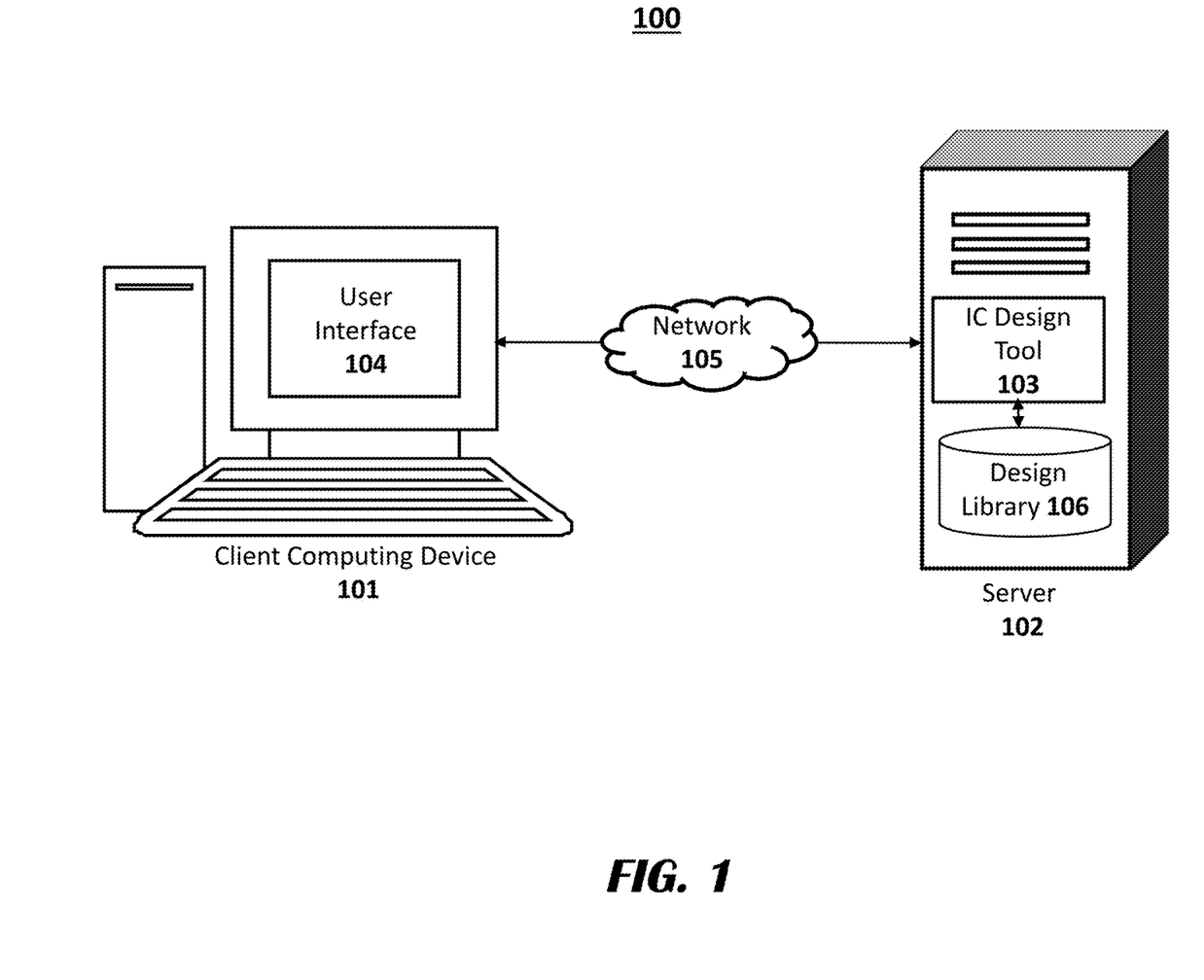
FIG. 1 shows an exemplary system for dynamically determining the target resistance for a partially routed net, rendering it and adjusting the wire width, according to an exemplary embodiment.

FIG. 1 illustrates an electronic design automation system 100, according to an exemplary embodiment. The electronic design automation system 100 may include any number of computing devices; the exemplary embodiment may include a client computing device 101 and a server 102. One or more components of the electronic design automation system 100 may be grouped and referred to as an electronic design automation tool (or EDA tool). The client 101 may be connected to the server 102 via hardware and software components of one or more networks 105. A network 105 may also connect various computing devices with databases or other components of the system 100. Examples of the network 105 include, but are not limited to, Local Area Network (LAN), Wireless Local Area Network (WLAN), Metropolitan Area Network (MAN), Wide Area Network (WAN), and the Internet. The communication over the network 105 may be performed in accordance with various communication protocols, such as Transmission Control Protocol and Internet Protocol (TCP/IP), User Datagram Protocol (UDP), and IEEE communication protocols.

A client device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client device 101 may be configured to communicate with one or more servers 102 of the system 100 through one or more networks 105, using wired and/or wireless communication capabilities. A user interface 104 may include a Graphical User Interface (GUI) that renders an interactive, graphical representation of an IC design, layout, schematic, or other logical representation of an IC that is being designed and optimized using an IC design tool 103. The GUI 104 may provide interactive elements, such as graphical representations of IC design elements (e.g., wires), for a user to manipulate the IC design layout. In some embodiments, the user interface 104 may include a text based interface allowing the user to enter manual commands for designing and optimizing the IC.

A server 102 may be accessible to the client device 101 via one or more networks 105. The server 102 may be any computing device comprising a processor and other computing hardware configured to execute an IC design tool 103 software module (e.g., EDA design software) that may analyze and optimize an IC design. In operation, using a client device 101 to access a design tool 103 hosted on a server 102 over a network 105, a circuit designer may interact with the IC design tool 103, through a number of input devices of the client device 101, such as by inputting a selection as with a mouse or inputting a request as with a keyboard. The IC design tool 103 may generate any number of graphical interface 104 responses based on the inputs received from the client device 101, and then send the data back to the client device 101 to be rendered on the GUI 104.

The server 102 may execute one or more component software modules of the IC design tool 103 software program, which may be a software program that allows users (e.g., engineers, circuit designers) to design and optimize circuit designs through software modules. The IC design tool 103 may provide users with interactive design interfaces 104 for designing an IC and the various design elements, execute automated optimization processes, and execute automated layout-generation processes. The server 102 may comprise, or may be in networked-communication with, non-transitory machine-readable media configured to store a netlist of or any other file including records of IC design elements, which may be a machine-readable computer file or a design database containing one or more records of design elements (e.g., circuit devices) of the IC design. In operation, the IC design tool 103 may analyze and optimize the design elements of the netlist or any other type of file associated with the IC design. Non-limiting examples of circuit devices may include memory devices (e.g., flops), combination logic gates (e.g., AND, OR, NOT, NOR, NAND, XOR), and multiplexers, among others. The netlist or any other type of file may also include records of a plurality of nets. The nets may be the records associated with the wires interconnecting the plurality of circuit devices.

The server 102 may include a design library 106 that is accessed by the IC design tool 103. The design library 106 may include instances of various circuit devices, for example, transistors used to layout an IC. In some embodiments, the design library 106 may include instances of nets used by the IC design tool 103 to generate an IC layout. An instance of a net may represent electronic circuit components such as a resistance, a via, transmission line, or an optical fiber line. The IC design tool 103 may use instances of nets in the design library 106 to generate a netlist of an IC that can be sent to a manufacturing facility for fabrication.

The exemplary system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities).

In operation, the exemplary system 100 may dynamically render one or more wire segments being edited based upon one or more dynamic edit inputs received from the user, and determine the resistance of the one or more wire segments being edited. The exemplary system 100 may further determine the resistance of partially routed net based upon resistance of existing wire segments and the resistance of wire segments being edited. In addition, the exemplary system 100 may dynamically render the resistance of the partially routed net and the maximum resistance constraint for the fully routed net.

Figure 2:
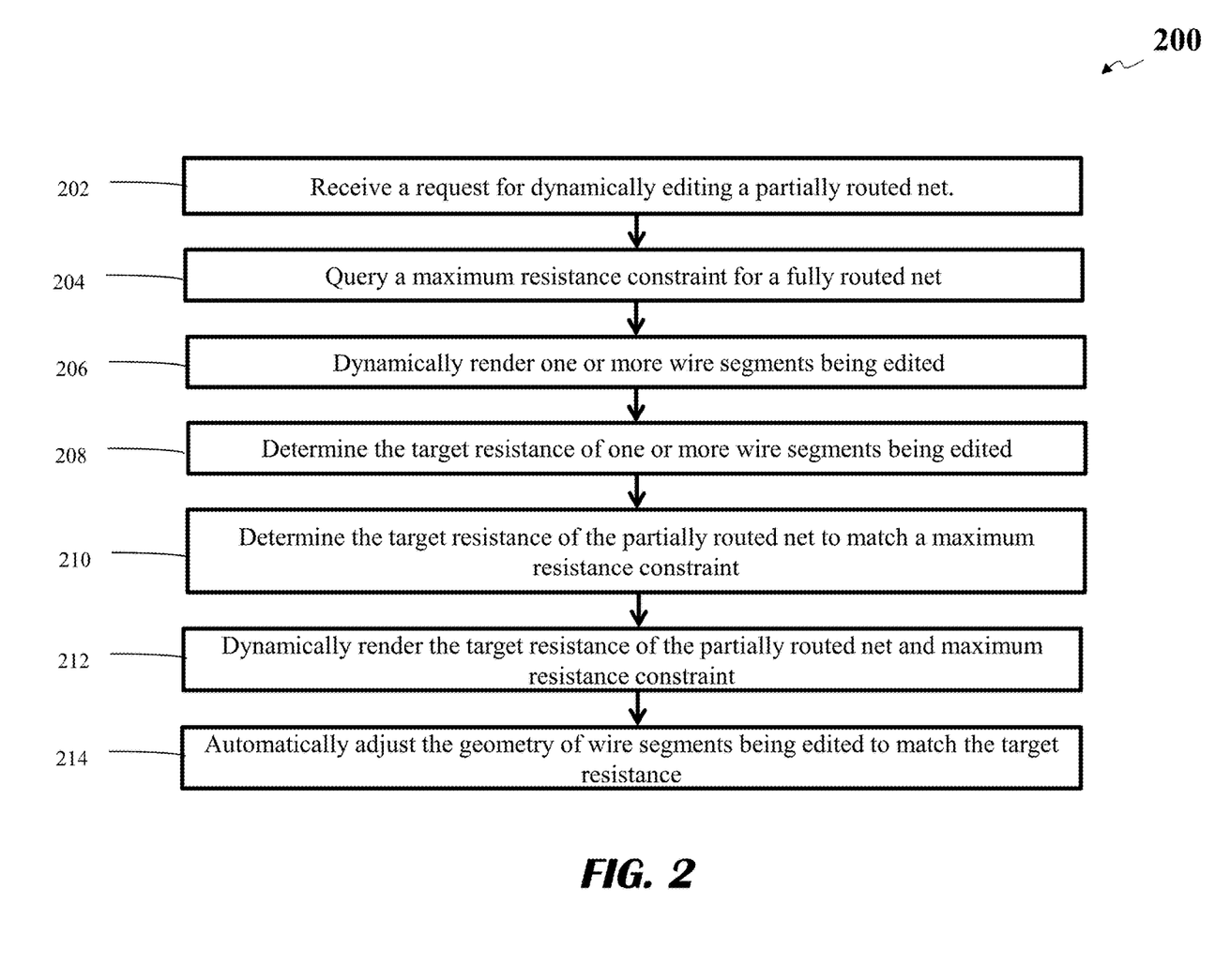
FIG. 2 shows an exemplary method for dynamically determining the target resistance for a partially routed net, rendering it and adjusting the wire width, according to an exemplary embodiment.

FIG. 2 shows an exemplary method for dynamically rendering resistance for a partially routed net, according to an exemplary embodiment. Although one or more computing devices and one or more databases may implement one or more steps of the method 200, the following description details a computer system implementing the steps of the method 200. One having skill in the art will appreciate that some embodiments may comprise additional or alternative steps, or may omit several steps altogether.

In a first step 202, the computer system may receive a request from a user for dynamically editing a partially routed net between a first circuit device and a second circuit device in an integrated circuit (IC). Non-limiting examples of circuit devices may include transistors, transmission lines, resistors, fiber optic components, and inductors. In some embodiments, the partially routed net between the first and second circuit devices may include one or more existing wire segments and one or more wire segments being edited. In other words, there may be some wire segments already existed between the first device and the second circuit devices, but the net between the first and second circuit devices is not fully routed yet. The user may further edit one or more wire segments based on the request. In the meantime, the user take the existing wire segments into consideration while editing the one or more wire segments to make sure the design specification of the request is met.

In a next step 204, the computer system may query a design specification database to retrieve a maximum resistance constraint for a fully routed net between the first and second circuit devices. In operation, the design specification database may include a design specification that states the functionality the finished design must provide. Specifically, the request may include a variety of electrical requirements, such as what signals the circuit will receive, what signals the circuit must output, what power supplies are available and how much power the circuit is permitted to consume. The specification may also set some of the physical parameters that the design must meet, such as size, weight, moisture resistance, temperature range, thermal output, vibration tolerance and acceleration tolerance. For example, the design specification database may include a record that states the maximum resistance constraint for a fully routed net between the first and second circuit devices.

The fully routed net between the first and second circuit devices may include the partially routed net and the unrouted segment. As a result, the maximum resistance constraint for the fully routed net is a constraint for the total resistance of each segment, such as one or more existing wire segments, one or more wire segments being edited, and one or more future wire segments. The one or more future wire segments are for the unrouted segment.

In a next step 206, the computer system may dynamically render the one or more wire segments being edited based upon one or more dynamic edit inputs received from the user. In some embodiments, the user may edit the one or more wire segments with a mouse. For example, the user may click the starting point of the wire segment and drag a mouse cursor to a certain length to edit the wire segment with mouse moving. As the mouse is moving, the one or more wire segments are being edited dynamically. Based on the edit inputs of the mouse, the computer system may dynamically render the one or more wire segments being edited. For example, the computer system may display the one or more segments in dynamic way so that the shape or size and the resistance of the one or more wire segments being edited are changing with the movement of the mouse cursor. In another embodiment, the user may edit the one or more wire segments with a keyboard. For example, the user may input the parameters of the one or more wire segments being edited through typing in keyboard. The computer system may render the wire segments based on the edit inputs.

In a next step 208, the computer system may determine the target resistance of the one or more wire segments being edited based upon the resistance of the one or more existing wire segments, the maximum resistance constraint, the wirelength of the one or more wire segments being edited, and the length of the unrouted segment between the first and the second circuit devices. In operation, the computer system may assume that the one or more wire segments being edited and the one or more future wire segments for the unrouted segment are in the same width and in the same metal layer. In some embodiments, the metal layer and the segment width of future wire segments may be different and known from the technology or design rules. Under such assumptions, the computer system may determine the target resistance of the one or more wire segments being edited according to the lengths of the one or more wire segments being edited and the future wire segments. In some implementations, the effective resistance of the one or more wire segments being edited is equal to the target resistance of the one or more wire segments being edited.

Specifically, the computer system may first calculate a remaining allowed resistance value for both the one or more wire segments being edited and the one or more future wire segments by deducting the resistance of the one or more existing wire segments from the maximum resistance constraint. As discussed above, the one or more future wire segments are for the unrouted segment. After deriving this remaining allowed resistance value, the computer system may future calculate the proportion of the length of the one or more wire segments being edited over the whole length of both the one or more wire segments being edited and the unrouted segment. Furthermore, the computer system may determine the resistance of the one or more wire segments being edited through multiplying its length proportion over the whole length by the remaining allowed resistance value.

In a next step 210, the computer system may determine the target resistance of the partially routed net based upon the target resistance of the one or more wire segments being edited and the resistance of the one or more existing wire segments. As the partially routed net includes the one or more wire segments being edited and the one or more existing wire segments, the computer system may determine the target resistance of the partially routed net by adding the target resistances of the wire segments being edited and the resistance of existing segments.

In a next step 212, the computer system may dynamically render the target resistance of the partially routed net and the maximum resistance constraint for the fully routed net between the first and second circuit devices. In operation, the computer system may render such values in the client device screen next to the one or more wire segments being edited. As the user edits the wire segments, the target resistance of the partially routed net may dynamically change. By rendering the changing value of target resistance of the partially routed net and maximum resistance constraint, the user may have a clear idea of whether the resistance between the first and second circuit devices satisfies the constraint. If not, the user may adjust the one or more wire segments being edited dynamically. As a result, the integrated circuit can converge faster to a final design that satisfies the maximum resistance constraint.

In some embodiments, the computer system may display other resistance values besides the target resistance of the partially routed net and the maximum resistance constraint. For example, the computer system may display the target resistance of the one or more wire segments being edited and/or the target resistance of the one or more future wire segments and/or the effective resistance of a wire segment and/or the effective resistance of the partially routed net.

In a next step 214, the computer system may automatically adjust and update the geometry, for example width, of the one or more wire segments being edited to match the target resistance. As the resistance of one or more existing wire segments is a value obtained based on the length, width, metal layer, number of cuts in vias of the existing wire segments, with the length, metal layer, number of cuts known, the computer system may determine the width of the one or more wire segments based on the target resistance value obtained from step 208. Furthermore, the computer system may display the one or more wire segments being edited according to the segment width.

Figure 3:
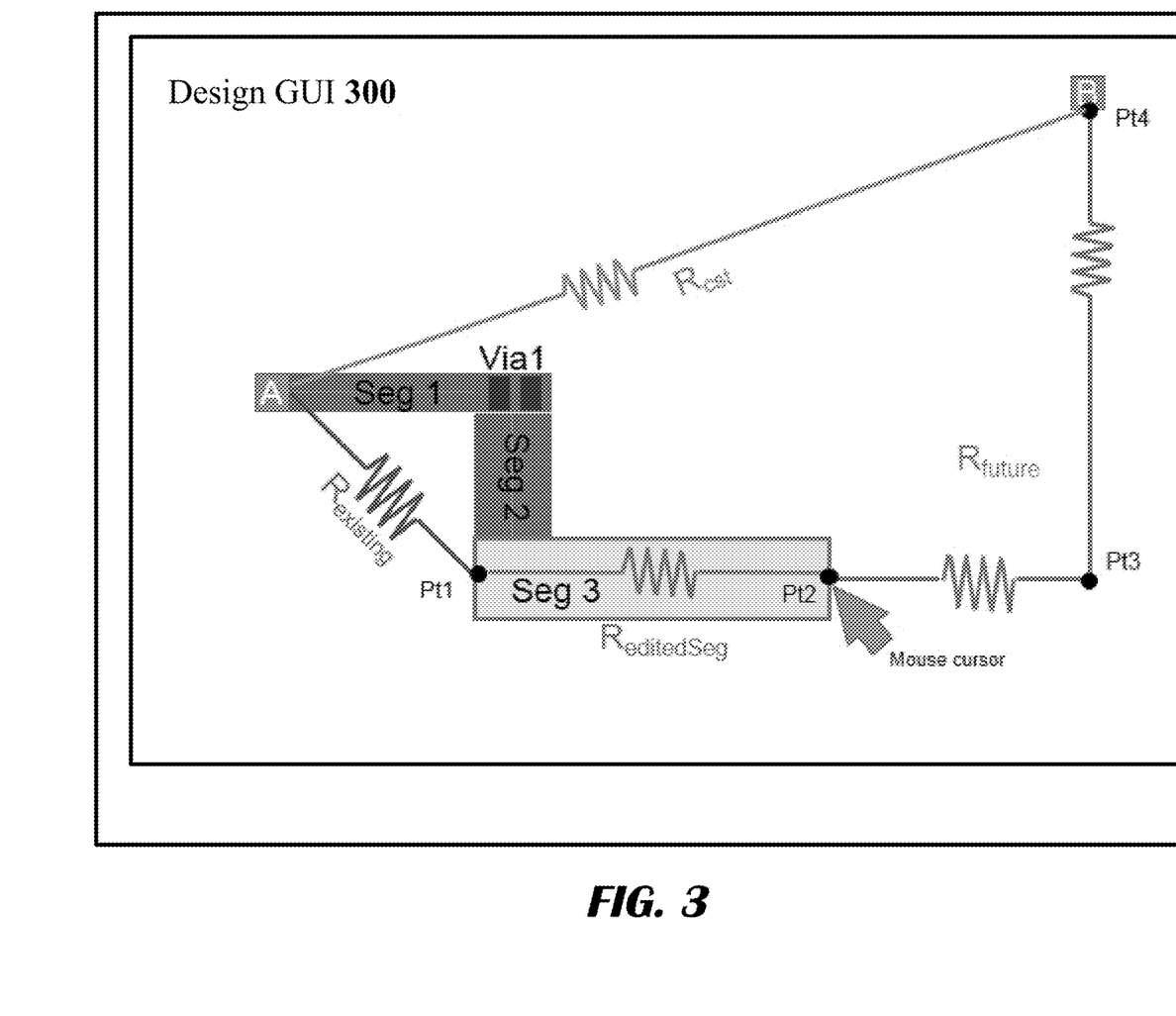
FIG. 3 shows an exemplary graphical user interface (GUI) rendering resistance for a partially routed net in the same metal layer, according to an exemplary embodiment.

FIG. 3 shows an exemplary GUI 300 generated by an electronic design automation (EDA) tool rendering resistance for a partially routed net in the same metal layer, according to an exemplary embodiment. The GUI 300 shows a first circuit device A and a second circuit device B. The maximum resistance constraint between A and B may be Rcst. As shown, there may be some wire segments already existing in the net between the first and second circuit devices A and B. The existing wire segments may include a first wire segment Seg 1 and a second wire segment Seg 2. These two wire segments may be connected by a via, e.g., Via 1. In other words, the resistance of the existing wire segments Rexisting may include total resistances of three parts: Seg 1, Seg 2, and Via 1. The user may dynamically edit one or more wire segments that start right next to the existing wire segments, which is point 1 (Pt1) in the GUI 300. As the user drags the mouse to a certain point such as point 2 (Pt2), the computer system may render the one or more wire segments being edited between Pt1 and Pt2, which is shown as Seg 3 in the figure. The unrouted segment between the first and second circuit devices A and B may be the segment from point 2 (Pt2) through point 3 (Pt3) to point 4 (Pt4). The resistance of wire segments being edited Seg 3 may be represented by ReditedSeg, the resistance of future wire segments for the unrouted segment may be represented by Rfuture. Since the maximum resistance constraint Rcst is for the fully routed net between A and B which includes each segment in the route, Rcst may have the following feature $$Rcst=Rexisting+ReditedSeg+Rfuture$$

The computer system may determine ReditedSeg based upon the assumption that the wire segments being edited and future wire segments are on the same metal layer and in the same width. In some embodiments, the metal layer and the segment width of future wire segments may be known from the technology or design rules. Under such assumption, the computer system may estimate the target resistance of the one or more segments being edited ReditedSeg and the resistance of future wire segments Rfuture based on respective length proportion. More specifically, the computer system first may first determine the sum value of ReditedSeg and Rfuture $$ReditedSeg+Rfuture=Rcst-Rexisting$$

This sum value may be the remaining allowed resistance for wire segments being edited (Seg 3) and future wire segments. The computer system may then determine the length of the wire segments being edited, represented as Length(Pt1,Pt2), and the length of future wire segments, represented as Length(Pt2,Pt3)+Length(Pt3,Pt4). The computer system may further determine the length proportions over the whole length of both segments being edited Prop_editedSeg and future segments Prop_future, $$Prop\_editedSeg=Length(Pt1,Pt2)/(Length(Pt1,Pt2)+Length(Pt2,Pt3)+Length(Pt3,Pt4))$$

$$Prop\_future=Length(Pt2,Pt3)+Length(Pt3,Pt4)/(Length(Pt1,Pt2)+Length(Pt2,Pt3)+Length(Pt3,Pt4))$$

The computer system may determine the target resistances ReditedSeg and Rfuture by multiplying the respective length proportions by the remaining allowed resistance.

$$ReditedSeg=Prop\_editedSeg(Rcst-Rexisting)$$

$$Rfuture=Prop\_future(Rcst-Rexisting)$$

Figure 4A:
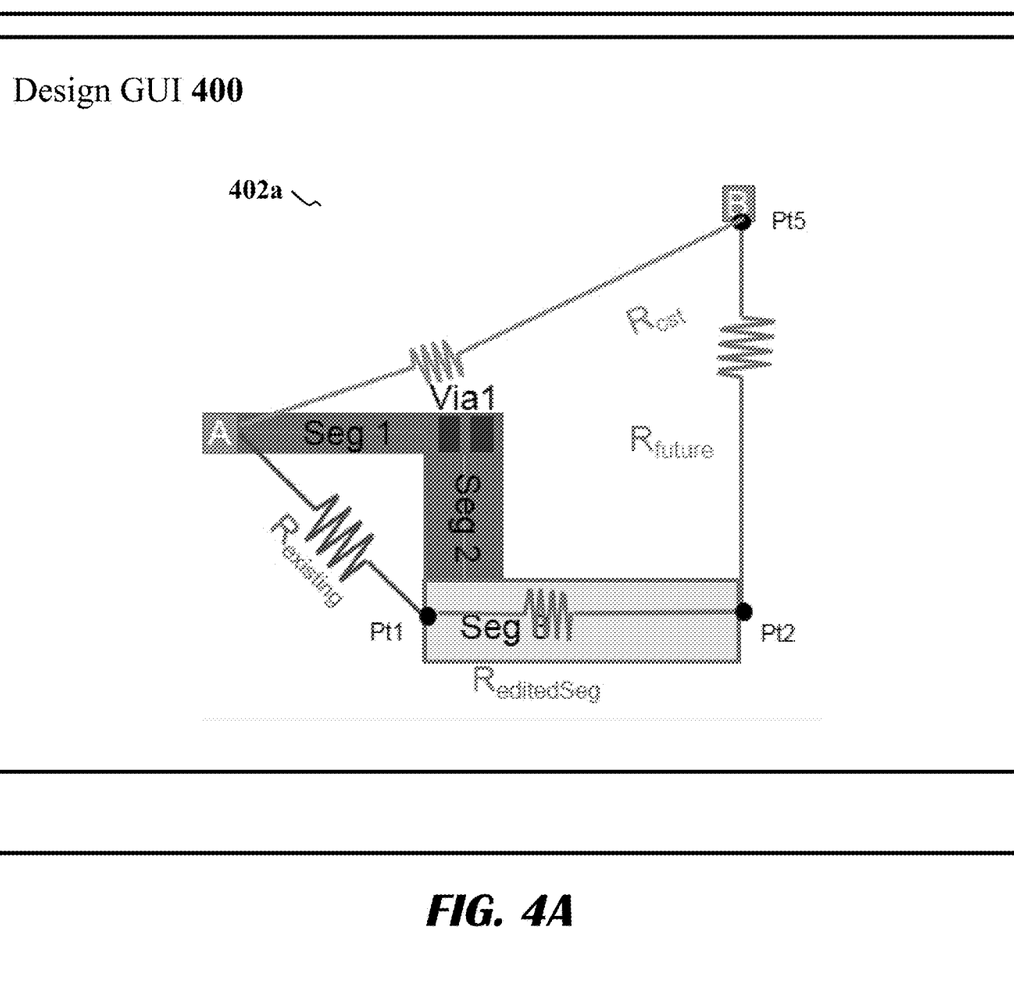
FIGS. 4A and 4B show exemplary GUIs rendering resistances for a partially routed net with different remaining lengths, according to an exemplary embodiment.
Figure 4B:
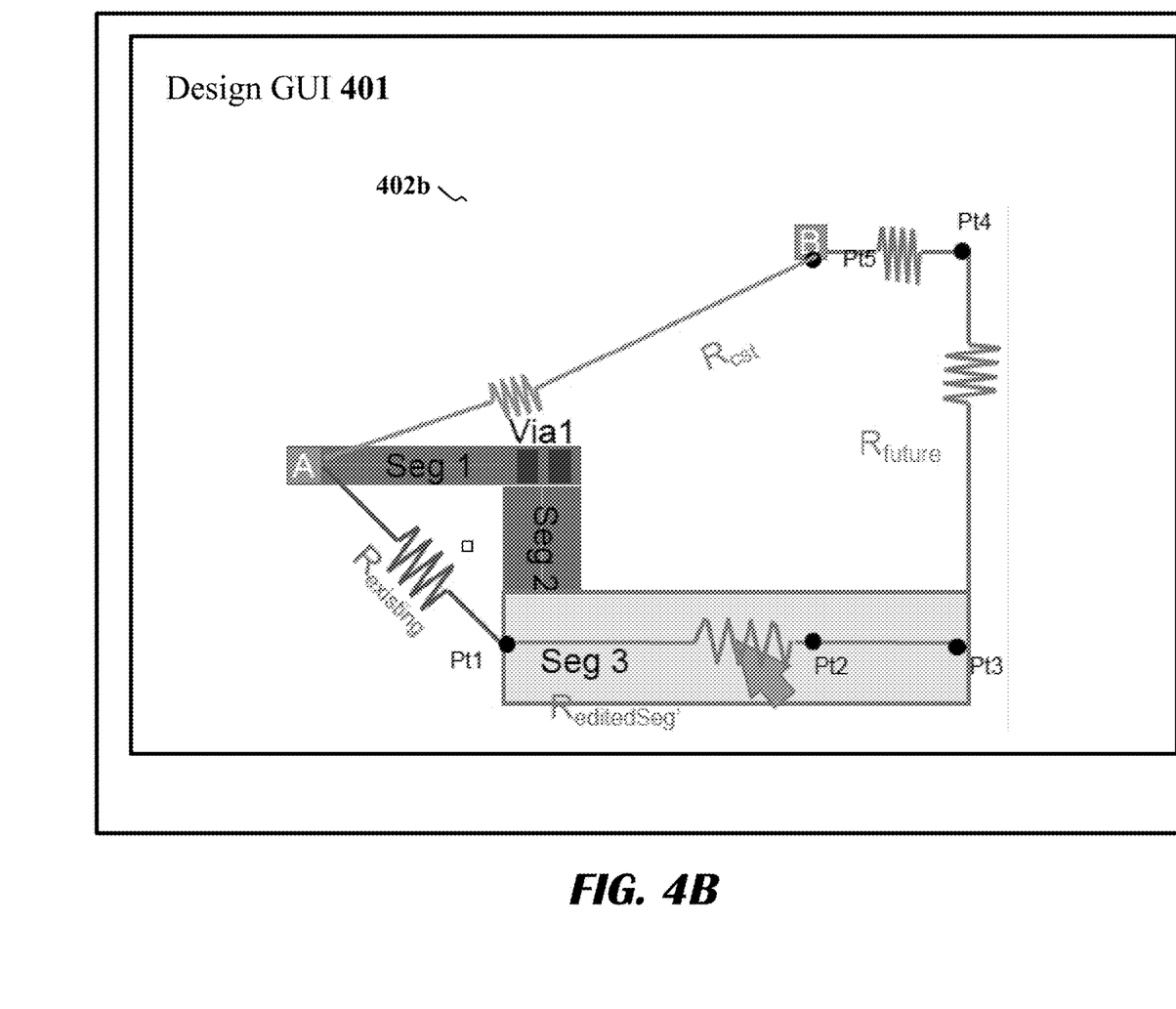

FIGS. 4A and 4B show exemplary GUIs 400 and 401 generated by an electronic design automation (EDA) tool rendering resistances for a partially routed net with different remaining lengths, according to an exemplary embodiment. In some implementations, the user may choose different routing paths for the net between two circuit devices. The target resistance of the one or more wire segments being edited may be affected by the different paths. Therefore, the computer system may re-render the one or more wire segments being edited when the user chooses a different routing path.

For example, the first net 402a in FIG. 4A and second net 402b in FIG. 4B may be two different scenarios for a net between two circuit devices A and B. The existing wire segments (Seg1, Via1, and Seg2) for both scenarios are the same. However, the remaining net from the existing segments to the second circuit devices may be different. For example, in FIG. 4A, the remaining net for net 402a is from point 1 (Pt1) through point 2 (Pt2) to point 5 (Pt5). In FIG. 4B, the remaining net for net 402b is from point 1 (Pt1) through points 2, 3, 4 (Pt2, Pt3, Pt4) to point 5 (Pt5). In other words, net 402a has a smaller remaining length than net 402b. As a result, while the user is editing one or more wire segments in the first and second nets, even if the wire segments being edited are with same length, their resistances may be different. More specifically, the target resistance of the wire segments being edited in net 402a may be larger than the target resistance of wire segments being edited in net 402b. This is because the wire segments being edited in 402a may have a larger length proportion when the remaining length for 402a is smaller. Therefore, the wire segments being edited in 402a may have a larger target resistance.

The resistance of a wire segment is related to the width of the wire segment. If the wire segment width is small, its resistance is larger, and vice versa. The resistance of wire segments being edited in 402a is larger than in 402b, thus the width of wire segments being edited in 402a is smaller than in 402b. The computer system may automatically consider different factors that may affect the resistance of the wire segments being edited, and re-render the wire segments being edited accordingly.

Figure 5:
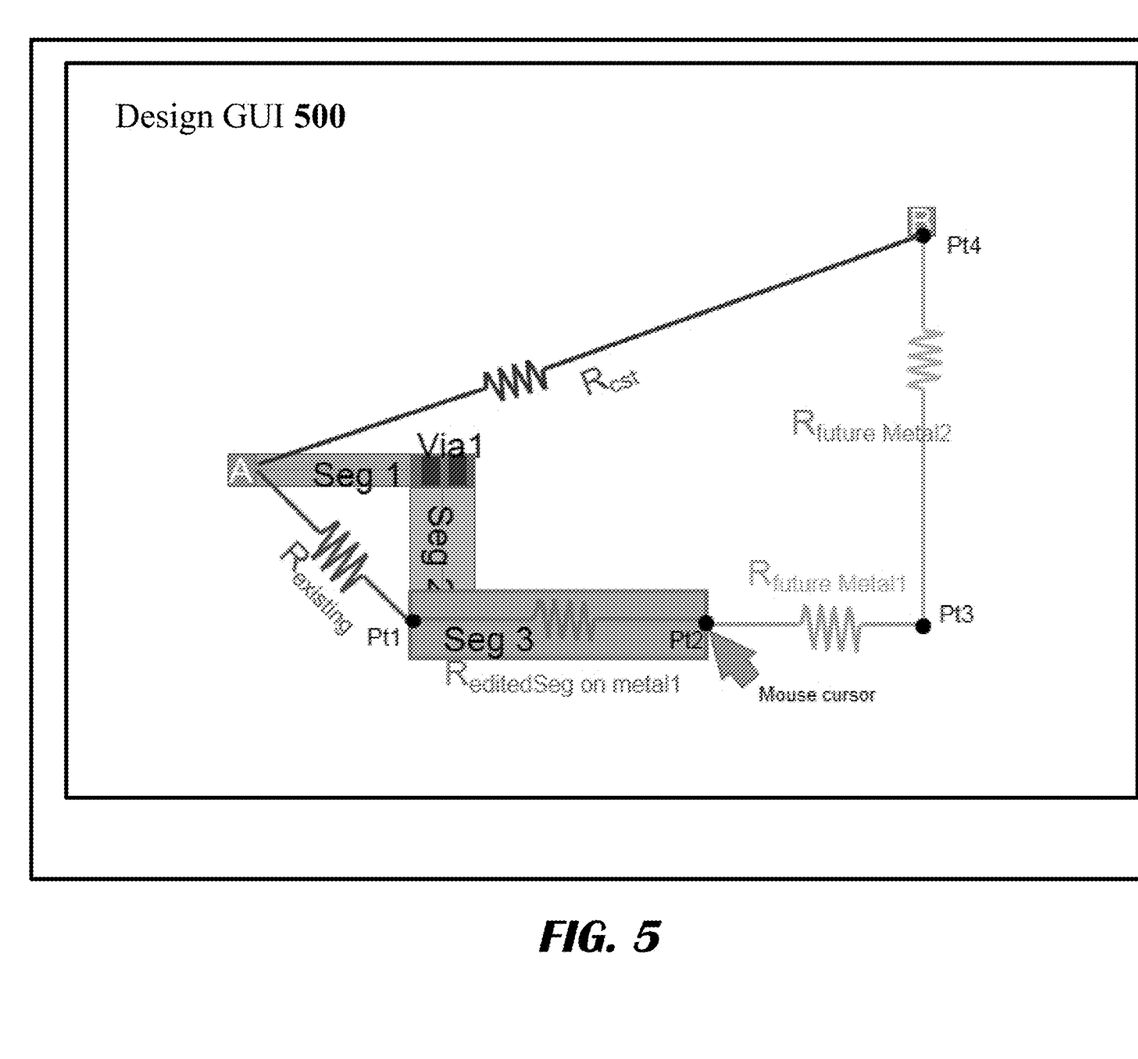
FIG. 5 shows an exemplary GUI showing rendering resistance for a partially routed net in different metal layers, according to an exemplary embodiment.

FIG. 5 shows an exemplary GUI 500 generated by an electronic design automation (EDA) tool rendering resistance for a partially routed net in different metal layers, according to an exemplary embodiment. In some implementations, the user may choose a different metal layer for the net between two circuit devices. The target resistance of the one or more wire segments being edited may be affected by the different metal layer. Therefore, the computer system may re-render the one or more wire segments being edited when the user chooses a different metal layer.

For example, as shown in FIG. 5, there may be two different metal layers, metal1 and metal2. While the user is editing one or more wire segments on first metal layer metal1, the unrouted segment may include segments in both metal layers. For example, the wire segments being edited in metal1 may go from point 1 (Pt1) to point 2 (Pt2). The unrouted segment may include segment in metal1 from point 2 (Pt2) to point 3 (Pt3) and segment in metal2 from point (Pt3) to point 4 (Pt4).

Since the net between two circuit devices may be in two different metal layers, the computer system may apply a scale factor on the segment in metal2 to determine the target resistance of the wire segments being edited. For example, the remaining length from Pt1 to Pt4 may not be a simple sum of each segment length. Instead, the segment from Pt3 to Pt4 in second metal may be multiplied by the scale factor $$(Length(Pt1,Pt2)+Length(Pt2,Pt3)+kLength(Pt3,Pt4))$$

where k may be a scale factor such that resistances on metal1 and metal2 has the relation of Rmetal2=kRmetal1. The computer system may further determine the length proportion of the wire segments being edited Prop_editedSeg over the remaining length.

$$Prop\_editedSeg=Length(Pt1,Pt2)/(Length(Pt1,Pt2)+Length(Pt2,Pt3)+kLength(Pt3,Pt4))$$

The computer system may finally determine the target resistance of wire segments being edited ReditedSeg by multiplying the length proportion by the remaining resistance, and render the wire segments being edited based on their target resistance.

$$ReditedSeg=Prop\_editedSeg(Rcst-Rexisting)$$

Figure 6:
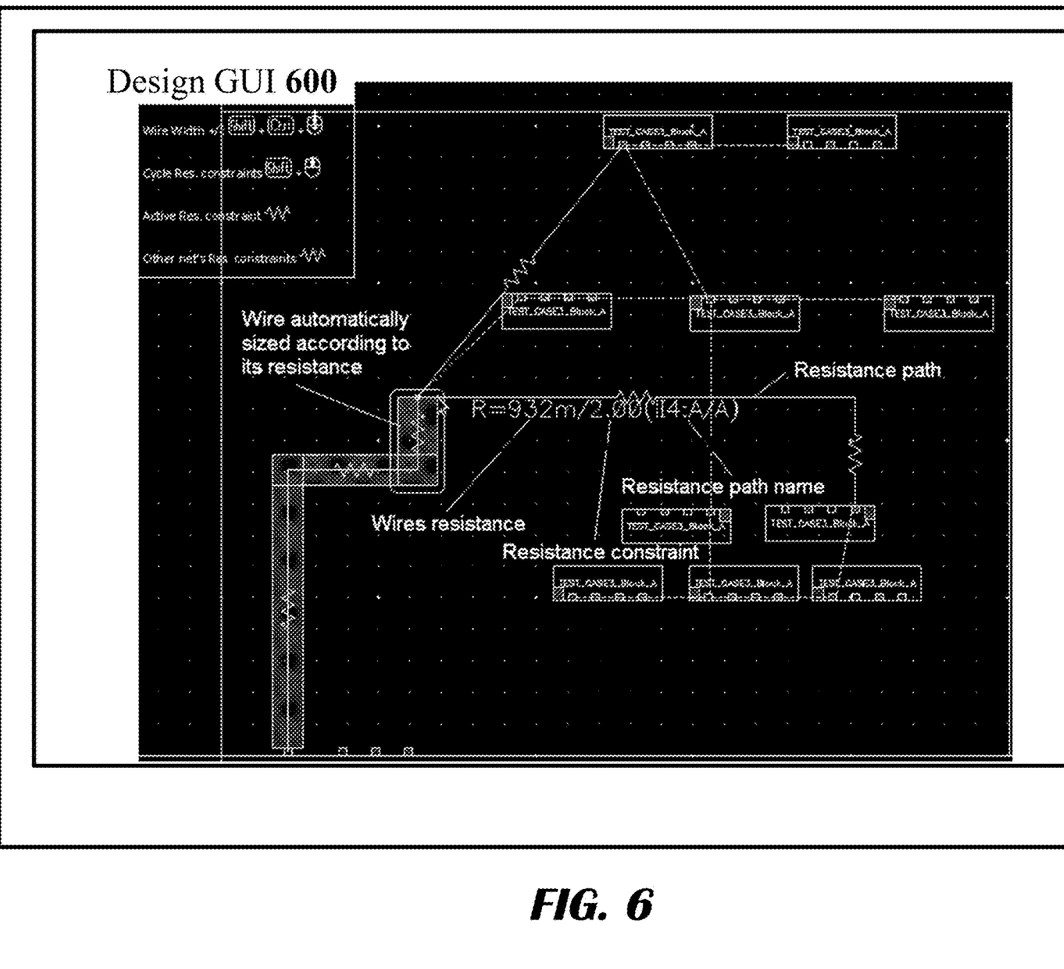
FIG. 6 shows an exemplary GUI showing screenshot of an EDA tool, according to an exemplary embodiment.

FIG. 6 shows an exemplary GUI showing screenshot of an EDA tool, according to an exemplary embodiment. The use may be using mouse to edit one or more wire segments. As the mouse is moving, the computer system may dynamically render the wire segments being edited. In this figure, right next to the rendered wire segments, the computer system may display the target resistance of partially routed net and the maximum resistance constraint, which is 932 milli Ohm/2.00 Ohm. The value of the target resistance of partially routed net may change with the dynamic edit input received from the user. For example, the value of 932 milliOhm may be changing with the movement of the user's mouse. In addition, the computer system may automatically size the one or more wire segments being edited based on the resistance value.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
receiving, by a computer, a request for dynamically editing a partially routed net between a first circuit device and a second circuit device in an integrated circuit (IC), wherein the partially routed net comprises one or more existing wire segments and one or more wire segments being edited;
querying, by the computer, a design specification database to retrieve a maximum resistance constraint for a fully routed net between the first and second circuit devices;
rendering, by the computer, the one or more wire segments being edited based upon one or more dynamic edit inputs received from a user;
determining, by the computer, a target resistance of the one or more wire segments being edited based upon the resistance of the one or more existing wire segments, the maximum resistance constraint, the wirelength of the one or more wire segments being edited, and the length of an unrouted segment between the first and second circuit devices;
determining, by the computer, a target resistance of the partially routed net based upon the resistance of the one or more segments being edited and the resistance of the one or more existing wire segments;

rendering, by the computer, the target resistance of the partially routed net and the maximum resistance constraint for the fully routed net between the first and second circuit devices; and determining, by the computer, a width of the one or more wire segments being edited to realize an effective resistance of the one or more wire segments being edited to be equal to the target resistance of the one or more wire segments being edited such that the fully routed net satisfies the maximum resistance constraint.

2. The method of claim 1, wherein the fully routed net between the first and second circuit devices comprises one or more existing wire segments, one or more wire segments being edited, and one or more future wire segments.

3. The method of claim 1, further comprising:
determining, by the computer, the resistance of one or more existing wire segments based upon width, layer, and number of cuts in vias of one or more existing wire segments.

4. The method of claim 1, further comprising
dynamically determining, by the computer, the target resistance of the one or more wire segments being edited such that the target resistance of the one or more wire segments being edited changes with movement of mouse cursor of the user.

5. The method of claim 1, wherein the one or more wire segments being edited and the unrouted segment are in same metal layer and have same width.

6. The method of claim 1, wherein the target resistance of the partially routed net is based upon the resistance of one or more existing wire segments and the target resistance of one or more wire segments being edited.

7. The method of the claim 1, the one or more wire segments being edited and the unrouted segment are in different metal layers and have the same width.

8. The method of claim 7, further comprising:
determining, by the computer, the target resistance of the partially routed net based upon a scale factor.

9. The method of claim 1, further comprising:
receiving, by the computer, one or more inputs indicating that the user has selected a different routing path for the one or more wire segments being edited;
determining, by the computer, an updated target resistance of the one or more wire segments being edited based on the one or more inputs; and
rendering, by the computer, the updated target resistance of the one or more wire segments being edited.

10. The method of claim 1, further comprising:
receiving, by the computer, one or more inputs indicating that the user has selected a different metal layer for the one or more wire segments being edited;
determining, by the computer, an updated target resistance of the one or more wire segments being edited based on the one or more inputs; and
rendering, by the computer, the updated target resistance of the one or more wire segments being edited.

11. A computer based system comprising:
one or more computers comprising a non-transitory machine-readable media configured to store a plurality of database records of a plurality of circuit devices forming an integrated circuit (IC);
at least one computer of the one or more computers, the at least one computer coupled to the non-transitory machine readable media storing the plurality of database records and comprising a processor configured to:

receive from a user, a request for dynamically editing a partially routed net between a first circuit device and a second circuit device of the plurality of circuit devices forming the IC, wherein the partially routed net comprises one or more existing wire segments and one or more wire segments being edited;

query a design specification database to retrieve a maximum resistance constraint for a fully routed net between the first and second circuit devices;

render the one or more wire segments being edited based upon one or more dynamic edit inputs;

determine a target resistance of the one or more wire segments being edited based upon the resistance of the one or more existing wire segments, the maximum resistance constraint, the wirelength of the one or more wire segments being edited, and the length of an unrouted segment between the first and second circuit devices;

determine a target resistance of the partially routed net based upon the resistance of the one or more segments being edited and the resistance of the one or more existing wire segments;

render the target resistance of the partially routed net and the maximum resistance constraint for the fully routed net between the first and second circuit devices; and determine a width of the one or more wire segments being edited to realize an effective resistance of the one or more wire segments being edited to be equal to the target resistance of the one or more wire segments being edited such that the fully routed net satisfies the maximum resistance constraint.

12. The system of claim 11, wherein the fully routed net between the first and second circuit devices comprises one or more existing wire segments, one or more wire segments being edited, and one or more future wire segments.

13. The system of claim 11, wherein the processor is further configured to:
determine, by the computer, the resistance of one or more existing wire segments based upon width, layer, and number of cuts in vias of one or more existing wire segments.

14. The system of claim 11, wherein the processor is further configured to:
dynamically determine the target resistance of the one or more wire segments being edited such that the target resistance of the one or more wire segments being edited changes with movement of mouse cursor of the user.

15. The system of claim 11, wherein the one or more wire segments being edited and the unrouted segment are in same metal layer and have same width.

16. The system of claim 11, wherein the target resistance of the partially routed net is based upon the resistance of one or more existing wire segments and the target resistance of one or more wire segments being edited.

17. The system of claim 11, the one or more wire segments being edited and the unrouted segment are in different metal layers and have the same width.

18. The system of claim 17, wherein the processor is further configured to:
determine the target resistance of the partially routed net based upon a scale factor.

19. The system of claim 11, wherein the processor is further configured to:
- receive one or more inputs indicating that the user has selected a different routing path for the one or more wire segments being edited;
- determine an updated target resistance of the one or more wire segments being edited based on the one or more inputs; and
- render the updated target resistance of the one or more wire segments being edited.

20. The system of claim 11, wherein the processor is further configured to:
- receive one or more inputs indicating that the user has selected a different metal layer for the one or more wire segments being edited;
- determine an updated target resistance of the one or more wire segments being edited based on the one or more inputs; and
- render the updated target resistance of the one or more wire segments being edited.

* * * * *